Figure 1:
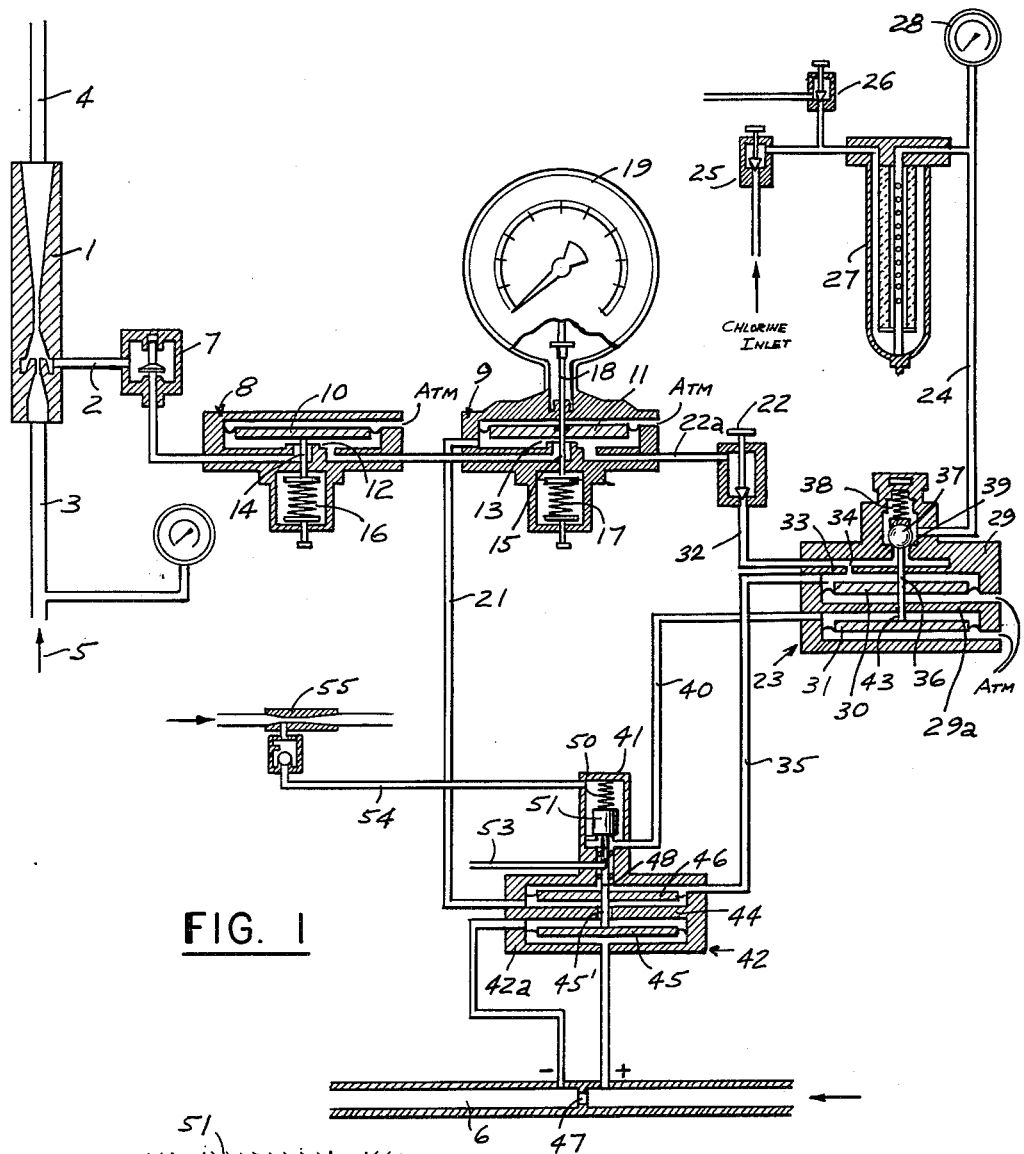

June 8, 1965   KARL-HEINZ ARENHOLD   3,187,764
CHLORINATING APPARATUS
Filed July 18, 1962

INVENTOR.
KARL-HEINZ ARENHOLD
BY Hane and Nydick
ATTORNEYS

United States Patent Office 3,187,764
Patented June 8, 1965

3,187,764
CHLORINATING APPARATUS
Karl-Heinz Arenhold, Karlsruhe-Durlach, Germany, assignor to Chlorator G.m.b.H., Grotzingen, Karlsruhe, Germany, a corporation of Germany
Filed July 18, 1962, Ser. No. 210,787
Claims priority, application Germany, July 25, 1961, C 24,697
9 Claims. (Cl. 137—114)

The invention relates to a vacuum-operated apparatus for admixing gaseous chlorine to a fluid flow such as water, and more particularly to a vacuum-operated apparatus in which the volume of the admixed chlorine is regulated in accordance with the volume of the fluid flow to be treated.

It is a broad object of the invention to provide a chlorinating apparatus of the general kind above referred to which utilizes the advantages of operation under vacuum, which eliminates the need for special means to compensate the adverse effect of variations in the pressure of the supplied chlorine, which can be installed at any selected distance from the conduit for the fluid flow to be treated, and which regulates the chlorine feed with a high degree of accuracy.

The aforementioned object and other objects, features and advantages of the invention which will be pointed out hereinafter, are attained by providing a chlorinating apparatus in which the chlorine to be admixed is sucked on by means of a main injector included in the fluid flow to be treated from a supply of chlorine under pressure through a diaphragm-operated, flow-controlling vacuum reduction valve and a setting valve for regulating the flow of chlorine fed to the vacuum reduction valve for control thereby and in which the volume of the chlorine admitted by the vacuum reduction valve to the fluid flow is further controlled by a pressure reduction valve including a measuring diaphragm responsive to a pressure drop across a constriction inserted in the fluid flow to be treated and generating a control vacuum which, in turn, controls said vacuum reduction valve in accordance with a change in the volume of the fluid flow, said pressure reduction valve also including a comparing diaphragm coupled in parallel with said measuring diaphragm and comparing the pressure drop with the control action of the vacuum reduction valve, said comparing diaphragm being connected to opposite sides of said setting valve for regulating the flow of chlorine to said vacuum reduction valve.

According to a preferred embodiment of the invention, the flow-controlling diaphragm of the vacuum reduction valve is connected either to a supply of vacuum or to the ambient atmosphere, depending upon the required control action. Such an arrangement affords the advantage that the control actions can be carried out with a minimum volume of air entering the vacuum chambers of the apparatus and is particularly advantageous when the vacuum is supplied by means of an injector. Ingress of an excessive volume of air causes undesirable inclusions of air in the flow of water or other fluid to be treated.

In the accompanying drawing a preferred embodiment of the invention is shown by way of illustration and not by way of limitation.

Figure 2:
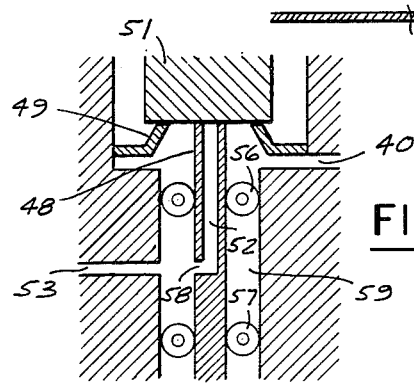

FIG. 1 shows diagrammatically the several components of a chlorinating apparatus according to the invention to the extent the showing of such components is essential to the understanding of the invention, and FIG. 2 shows part of FIG. 1 on an enlarged scale.

Chlorine is sucked on through a pipe 2 from a suitable supply of chlorine such as chlorine bottled under pressure (not shown) by means of a main injector 1. The injector is shown as being of the Venturi type and is included in pipes 3 and 4 through which flows the fluid to be treated in the direction of the arrow 5. Pipes 3 and 4 should be visualized as constituting a branch or bypass branched off from a main flow, such as a water main 6. The branch flow is branched off from the main flow at a suitable point and is returned into the same at another suitable point. A pressure pump (not shown) may be included in the branch or bypass flow in a conventional manner to maintain a constant rate of flow of water in the bypass.

Injector 1 is separated from the other components of the apparatus by means of a one-way valve 7 which prevents the ingress of water into the apparatus when the suction action of the injector ceases for any reasons. The vacuum generated in pipe 2 is limited by means of two diaphragm-controlled vacuum regulating means 8 and 9 to values suitable for the apparatus. Each of regulators 8 and 9 comprises a diaphragm 10 and 11 respectively which are suitably mounted in the housing of the regulators. The top side of each diaphragm is exposed to the ambient atmosphere or other source of pressure and the bottom side is subjected to the vacuum prevailing in pipe 2. In both regulators, the diaphragm serves as a valve disc controlling a valve opening 12 and 13, respectively through which the vacuum in pipe 2 acts upon the respective diaphragm. Each diaphragm mounts a pin 14 and 15 respectively extending through the respective valve opening and biased by a spring 16 and 17 respectively into the opening direction of the respective diaphragm. As is evident, the diaphragms will be pressed against the respective valve openings, thereby cutting off injector 1 from the remaining components of the apparatus when the vacuum prevailing in pipe 2 and acting upon the diaphragms overcomes the action of springs 16 and 17 in the opening direction.

Regulator 8 serves as a preregulator and cuts off the injector when a vacuum corresponding to 2,000 mm. water column is built up, whereas regulator 9, which serves as a main regulator and cuts off when a vacuum corresponding to 1,000 mm. water column is reached, thereby limiting the vacuum acting upon the remaining components of the apparatus to a value of 1,000 mm. water column.

The top side of diaphragm 11 mounts a pin 18 which operates a measuring device 19 for measuring and indicating the admitted volume of chlorine. The design of the measuring device does not constitute part of the invention and a measuring device suitable for the purpose of the present invention is fully described in my copending application Serial No. 50,397, filed August 18, 1960, now Patent Number 3,140,726.

The chamber defined by the bottom side of the diaphragm 11 and the housing of regulator 9 is connected to a pipe 21, the purpose of which will be more fully explained hereinafter. The same chamber, access to which is controlled by the position of diaphragm 11 in reference to valve opening 13, is further connected by a pipe 22a to one side of a setting valve 22, which serves to regulate the volume of chlorine which is admitted to the water flow in pipes 3 and 4 under the control of the other components of the apparatus in response to the suction and pressure conditions in the system which will be more fully explained hereinafter. Valve 22 should be visualized as a valve that can be accurately set, such as a needle valve and may be adjusted by hand. The other side of the valve is connected by a pipe 32 to a vacuum-reduction valve 23.

The vacuum reduction valve comprises a ball valve 37, the positioning of which will be more fully described hereinafter. The valve ball controls the flow of chlorine through an inlet pipe 24 which is connected through a cut-off valve 25, a venting valve 26, a filter 27 and a manometer 28 to the chlorine supply, such as a pressure bottle previously referred to. Devices 25, 26, 27 and 28 should be visualized as being conventional.

Vacuum-reduction valve 23 comprises a housing 29 separated by a partition wall 29a into two chambers. Each of the chambers accommodates a diaphragm 30 and 31 respectively. Diaphragm 30 is exposed on its top side to the vacuum reaching the respective chamber through valve 22 and pipe 32. The vacuum pipe 32 is not connected directly to the chamber above diaphragm 30 but to a separate space formed by a baffle wall 33 which communicates through a narrow orifice 34 with the chamber proper in which the diaphragm 30 is located. This chamber is further connected to a pipe 35, the purpose of which will be more fully explained hereinafter. The opposite or bottom side of diaphragm 30 communicates with the ambient atmosphere.

Diaphragm 30 mounts on its top side a pin 36 slidably extending through baffle wall 33 and pressing against valve ball 37 from below. The ball is pressed against a valve seat 39 by an adjustable spring 38 mounted on the top side of housing 29. The aforementioned pipe 24 leading to the supply of chlorine connects to the housing space above valve ball 37.

The lower diaphragm 31 of the vacuum reduction valve 23 serves as a diaphragm for regulating the volume of admitted chlorine, as will be more fully described herein. The bottom side of the diaphragm communicates with the ambient atmosphere and the top side of the diaphragm is connected through a pipe 40 to a control valve 41 of a pressure reduction valve 42. The top side of diaphragm 31 supports at its center a pin 43, which extends slidably, but sealed, through partition wall 29a and presses from below against the upper diaphragm 30.

The pressure reduction valve 42 comprises a housing 42a which is divided into two chambers by a partition wall 44. Each of the chambers accommodates a diaphragm 45 and 46 respectively which are mounted in a conventional manner. The two diaphragms are fixedly coupled by means of a pin 45′ extending through partition 44 sealed in reference thereto. The lower diaphragm 45 controls the effective pressure in the apparatus and is connected for that purpose to the high pressure side of a constriction 47 inserted in water main 6. As is evident, a pressure drop will occur across the constriction. The top side of diaphragm 45 is connected to the low pressure side of the constriction. The bottom side of the upper diaphragm 46 is connected through pipe 21 to the vacuum controlled by main regulator 9. This vacuum is also connected to one side of setting valve 22 through pipe 22a. The top side of diaphragm 46 is connected through pipe 35 to the chamber above diaphragm 30 of the vacuum reduction valve and hence is connected to the other side of setting valve 22.

As can best be seen in FIG. 2, the aforementioned control valve 41 is mounted on the top of the housing of pressure reduction valve 42. A pin or rod 48 fixedly secured to diaphragms 45 and 46 extends into the housing of valve 41 slidable, but sealed in reference thereto. Accordingly, pin 48 will participate in the deflections of the diaphragms. It protrudes with its upper end through a valve seat 49 below which pipe 40 leading to the vacuum reduction valve 23 is connected. A valve plunger 51 is pressed by a spring 50 upon valve seat 49. Pin 48 has a longitudinal bore 52 and a transverse bore 58 issuing into an annular chamber 59 which can communicate with the ambient atmosphere by means of a pipe 53 located below valve seat 49 and sealed off in reference thereto by O rings 56 and 57. The space of valve 41 above valve seat 49 and plunger 51 is connected by a pipe 54 to an auxiliary injector 55 which may be included in bypass 3 and 4, main 6 or another flow of water as is most convenient in a specific installation.

When the two coupled diaphragms 45 and 46 of the pressure reduction valve are moved upwardly, the pin or rod 48 pushes from below against valve plunger 51 and lifts the same from its seat. As a result, the vacuum produced by auxiliary injector 55 is extended through valve seat 49 and pipe 40 to the chamber above volume-controlling diaphragm 31 of the vacuum reduction valve. Lifting of pin 48 also lifts the longitudinal bore 52 of pin 48, thus disconnecting the bore from the atmospheric pressure prevailing in pipe 53. As is now evident, downward displacement of pin 48 so far that valve plunger 51 is seated upon valve seat 49 interrupts the connection between the auxiliary injector and the vacuum reduction valve 23, but connects the atmospheric pressure in pipe 53 through bore 52 and pipe 40 to the top side of diaphragm 31 of the vacuum reduction valve.

The operation of the apparatus as heretofore described, is as follows:

The vacuum generated by the suction of main injector 1 is extended, after lifting of one-way valve 7 from its seat, through preregulator 8, main regulator 9 and setting valve 22 to vacuum reduction valve 23. The vacuum acts through the orifice 34 in baffle wall 33 upon the top side of diaphragm 30 so that the atmospheric pressure acting upon the bottom side of the diaphragm deflects the same upwardly with a certain force. Consequently, pins 36 tries to lift valve ball 38 from its seat against the action of spring 38. However, the vacuum reduction valve is so set that it remains securely closed within the range of evacuation determined by the main regulator (1,000 mm. water column). The vacuum which is built up, is conducted through pipes 21 and 35 to the opposite sides of the upper diaphragm 46 of the pressure reduction valve 42 also. If the differential pressure on the top and the bottom side of diaphragm 46 is zero, diaphragm 46 does not perform any controlling action.

The flow of water in main 6 and the resulting pressure drop across constriction 47 which is made effective on both sides of diaphragm 45 of pressure reduction valve 42 causes an upward deflection of the fixedly coupled diaphragms 45 and 46. As a result, valve plunger 51 is lifted by means of pins 45′ and 48 from seat 49 and hence opens the connection between auxiliary injector 55 and the space above diaphragm 31 of the vacuum reduction valve 23. This space is now evacuated until the action of the vacuum upon diaphragm 31 is sufficient to cause diaphragm 31 by means of pin 43, diaphragm 30 and pin 36 to lift the valve ball 37 from its seat, thereby opening the admission of chlorine. The inflowing chlorine reduces the vacuum prevailing in the space above diaphragm 30 and the counter-pressure thus built up is conducted through pipe 35 to the space above the pressure-comparing diaphragm 46 of the pressure reduction valve. The space below the pressure-comparing valve 46 remains under the influence of the vacuum determined by the setting of main regulator 9 (for example, 1,000 mm. water column), hence, under a pressure that is lower than the pressure acting upon the top side of the pressure-comparing diaphragm 46. As a result a downwardly directed force acts upon the coupled diaphragms 45 and 46 and this downwardly directed force opposes the force acting upon diaphragm 45 due to the pressure drop across constriction 47. The evacuation of the space above diaphragm 31 of the vacuum reduction valve effected by injector 55 due to the pressure drop across the constriction, as previously described, continues until the counter-pressure built up by the inflowing chlorine is in balance with the effective pressure produced by the constriction. As soon as this condition of balance is reached, the coupled diaphragms 45 and 46 of the pressure reduction valve again move downwardly, whereby valve plunger 51 lifted by pin 48 also moves downwardly and interrupts, by setting itself upon valve seat 49, the connection between auxiliary injector 55 and diaphragm 31. Hence the space above diaphragm 31 is no longer evacuated and the vacuum-reduction valve 23 will retain its setting until a new setting becomes necessary due to any disturbance of the condition of balance.

The balance can be upset, for instance, by an increase in pressure of the supply of chlorine due to an elevation of temperature so that more chlorine than before will flow through a given valve opening set by the position of valve ball 37. In such event the vacuum above diaphragm 30 of the vacuum-reduction valve and hence above comparing-diaphragm 46 of the pressure reduction valve, is reduced, that is, a higher pressure is now prevailing whereby the coupled diaphragms 45 and 46 of the pressure reduction valve are moved downwardly. Such downward movement has no effect upon the position of valve plunger 51 seated upon its seat 49, but frees the opening in the bore 52 of pin 48 from closure by valve plunger 51. Hence the space above diaphragm 31 which was previously evacuated is now connected to the ambient atmosphere. The resulting destruction of the vacuum in the space above diaphragm 31 causes a downward movement of the diaphragm. As a result the force seeking to hold valve ball 37 in an open position is smaller and the valve opening is correspondingly reduced. In this manner the adjustment of the valve opening at ball 37 follows very rapidly a change in the chlorine pressure and the actually admitted volume of chlorine remains the same even though the pressure of the chlorine supply has risen.

In the event the rate of flow of water through the water main 6 decreases and the effective pressure acting upon diaphragm 45 of pressure reduction valve 42 decreases accordingly, the two diaphragms 45 and 46 of the valve are deflected downwardly due to the action of the pressure fed to valve 41 through pipe 35 from the space above diaphragm 30 of the vacuum reduction valve 23. Valve plunger 59 remains seated on its seat 49 and pin 48 connects again the space above the volume-controlling diaphragm 31 of the vacuum reduction valve to the ambient atmosphere, as has been previously described. This space remains in communication with the atmosphere until the resulting reduction in the opening of the valve control ball 37 causes a corresponding reduction of the pressure in the space above diaphragm 30. When the effective pressure and the pressure in the chamber above diaphragm 30 and thus also above the comparing-diaphragm 46 are in balance, the two diaphragms 45 and 46 of the pressure reduction valve are deflected upwardly until the position of deflection is reached in which bore 52 of pin 48 is no longer in connection with the atmosphere.

Accordingly, the pressure in pipe 40 is not a definite one and depends only on the force tending to lift valve ball 37 without affecting the degree of the control accuracy.

The aforedescribed operation of the apparatus does not change when it is desired to admix less chlorine per unit of water by changing the setting of setting valve 22. The control operation depends in practice only upon a comparison of the differential pressure in the pressure reduction valve with the differential pressure at valve 22 which serves as a throttling valve. The points at which the pipes communicating with the pressure reduction valve are connected, are selected to keep valve 22 free of pressure oscillations.

In the previous description a preferred embodimnt of the invention is described. Obviously, many modifications can be provided within the scope of the invention. The vacuum reduction valve may be, for instance, a disc valve, a needle valve, etc. The measuring instrument may be a rotameter or any other suitable instrument. The vacuum used for controlling the pressure reduction valve may be derived from the vacuum produced by main injector 1, and the pressure reduction valve itself may be of a design different from that shown.

What is claimed is:

1. In an apparatus for admixing gaseous chlorine to a fluid flow in which apparatus the chlorine to be admixed is sucked on by a main injector included in the fluid flow to be treated from a supply of chlorine under pressure through a diaphragm-operated, flow-controlling vacuum reduction valve and a setting valve for regulating the flow of chlorine fed to the vacuum reduction valve for control by the same, conduit means connecting said main injector to one side of said setting valve, the other side of the setting valve being connected to one side of the diaphragm of the vacuum reduction valve, the other side of said diaphragm being connected to the atmosphere, and in which apparatus the volume of chlorine admitted by the vacuum reduction valve to the fluid flow is further controlled by means associated with said vacuum reduction valve and responsive to a pressure reduction valve including a measuring diaphragm responsive to a pressure drop across a constriction in a fluid flow which is proportional to the flow of fluid to be treated and controlling said vacuum reduction valve in accordance with a change in the volume of the fluid flow to be treated, said pressure reduction valve also including a comparing diaphragm coupled in parallel with said measuring diaphragm for comparing the response of the measuring diaphragm to the pressure drop across said constriction with the control action of said vacuum reduction valve as actually effected by the measuring diaphragm, and a diaphragm-controlled vacuum-regulating means included in the conduit means connecting said main injector to said setting valve, one side of the diaphragm of said regulating means being exposed to the vacuum and the other side to the atmosphere, one side of said comparing diaphragm of the pressure reduction valve being connected to the side of the diaphragm of the vacuum-regulating means exposed to the vacuum and the other side of said comparing diaphragm being connected to said one side of the diaphragm of the vacuum reduction valve connected to the other side of the setting valve and exposed to the vacuum generated by the suction of said main injector.

2. A chlorinating apparatus according to claim 1 and comprising a source of vacuum and wherein said vacuum reduction valve comprises a second diaphragm coacting with the first diaphragm of said valve to control the flow control action thereof and wherein conduit means connect said pressure reduction valve to one side of the second diaphragm of the vacuum reduction valve either to said source of vacuum or to the ambient atmosphere, depending upon whether an increase or a reduction in the supply of chlorine to be fed to the fluid flow to be treated is required, the other side of said second diaphragm being always connected to the atmosphere.

3. A chlorinating apparatus according to claim 2 wherein said source of vacuum comprises an auxiliary injector included in a flow of fluid and independent of said main injector.

4. A chlorinating apparatus according to claim 2 wherein a valve member is included in said conduit means connecting said source of vacuum and said one side of the second diaphragm of the vacuum reduction valve, the position of said valve member in reference to a seat therefor being controlled by a valve rod extending through said valve and coupled to the diaphragms of the pressure reduction valve, said valve rod being lengthwise displaceable in reference to the valve seat and valve member by a deflection of said diaphragms and including a longitudinal bore extending through one end of said rod and communicating with the atmosphere at the other end, said bore being closed against said valve member at said one end in a predetermined lengthwise position of the rod, said rod on displacement in one direction beyond said predetermined position lifting said valve member off its seat and establishing communication between said source of vacuum and said vacuum reduction valve, and on displacement in the opposite direction away from said valve member establishing communication between said vacuum reduction valve and the atmosphere.

5. A chlorinating apparatus according to claim 4 wherein said valve member comprises a spring-loaded plunger.

6. A chlorinating apparatus according to claim 1 wherein a second diaphragm-controlled vacuum regulating means is interposed in said conduit means and located between the main injector and the first vacuum regulating means.

7. A chlorinating apparatus according to claim 1 wherein said vacuum reduction valve comprises a ball valve controlling the flow of chlorine to said valve from said supply of chlorine.

8. A chlorinating apparatus according to claim 1, wherein said vacuum regulating means and said vacuum reduction valve are so correlated that a vacuum causing closing of the vacuum regulating means is insufficient to open the vacuum reduction valve for the passage of chlorine unless an additional opening force is supplied to the vacuum reduction valve.

9. A chlorinating apparatus according to claim 1 wherein said one side of the diaphragm of the vacuum reduction valve is separated from the suction of the main injector by a baffle including an aperture.

References Cited by the Examiner

UNITED STATES PATENTS

| | | | |
|---|---|---|---|
| 1,901,032 | 3/33 | Kallum | 137—100 |
| 2,637,690 | 5/53 | Everson | 137—100 |
| 3,030,974 | 4/62 | Arenhold | 137—100 |

ISADOR WEIL, *Primary Examiner.*

MARTIN P. SCHWADRON, WILLIAM F. O'DEA,
*Examiners.*